(12) United States Patent
Trindade

(10) Patent No.: US 6,643,103 B1
(45) Date of Patent: Nov. 4, 2003

(54) VERY HIGH LINEAR RESOLUTION CPP DIFFERENTIAL DUAL SPIN VALVE MAGNETORESISTIVE HEAD

(75) Inventor: Isabel G. Trindade, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 134 days.

(21) Appl. No.: 09/755,019

(22) Filed: Jan. 5, 2001

Related U.S. Application Data

(60) Provisional application No. 60/174,626, filed on Jan. 5, 2000.

(51) Int. Cl.[7] .................................................. G11B 5/39
(52) U.S. Cl. ....................................................... 360/314
(58) Field of Search ................................. 360/314, 324, 360/324.1, 324.11, 324.12

(56) References Cited

U.S. PATENT DOCUMENTS

| | | | | |
|---|---|---|---|---|
| 5,287,238 A | * | 2/1994 | Baumgart et al. ........... | 360/314 |
| 5,406,433 A | | 4/1995 | Smith .......................... | 360/113 |
| 5,442,508 A | * | 8/1995 | Smith .......................... | 360/314 |
| 5,627,703 A | | 5/1997 | Smith .......................... | 360/113 |
| 5,668,688 A | * | 9/1997 | Dykes et al. ................ | 360/113 |
| 5,731,937 A | * | 3/1998 | Yuan ............................ | 360/322 |
| 5,751,521 A | * | 5/1998 | Gill ............................. | 360/314 |
| 5,768,069 A | * | 6/1998 | Mauri .......................... | 360/314 |
| 5,825,595 A | * | 10/1998 | Gill ............................. | 360/314 |
| 5,828,525 A | | 10/1998 | Iwasaki et al. .............. | 360/113 |
| 5,859,753 A | * | 1/1999 | Ohtsuka et al. ............. | 360/314 |
| 5,920,446 A | * | 7/1999 | Gill ............................. | 360/324 |
| 6,002,553 A | * | 12/1999 | Stearns et al. ............... | 360/324 |
| 6,055,136 A | * | 4/2000 | Gill et al. .................... | 360/314 |
| 6,185,079 B1 | * | 2/2001 | Gill ........................... | 360/324.2 |
| 6,191,926 B1 | * | 2/2001 | Everitt et al. ........... | 360/324.11 |
| 6,205,008 B1 | * | 3/2001 | Gijs et al. ................... | 360/324 |
| 6,317,297 B1 | * | 11/2001 | Tong et al. .................. | 360/314 |
| 6,392,849 B2 | * | 5/2002 | Maruyama et al. ......... | 360/314 |

* cited by examiner

*Primary Examiner*—William Korzuch
*Assistant Examiner*—Christopher R. Beacham
(74) *Attorney, Agent, or Firm*—Kinney & Lange, P.A.

(57) ABSTRACT

A dual spin valve read head includes first and second spin valve stacks configured to operate in a current perpendicular to plane (CPP) mode. The first and the second spin valve stacks each include a free layer. A spacer is positioned adjacent the free layers of the first and the second spin valve stacks and spaces the first spin valve stack apart from the second spin valve stack.

14 Claims, 8 Drawing Sheets

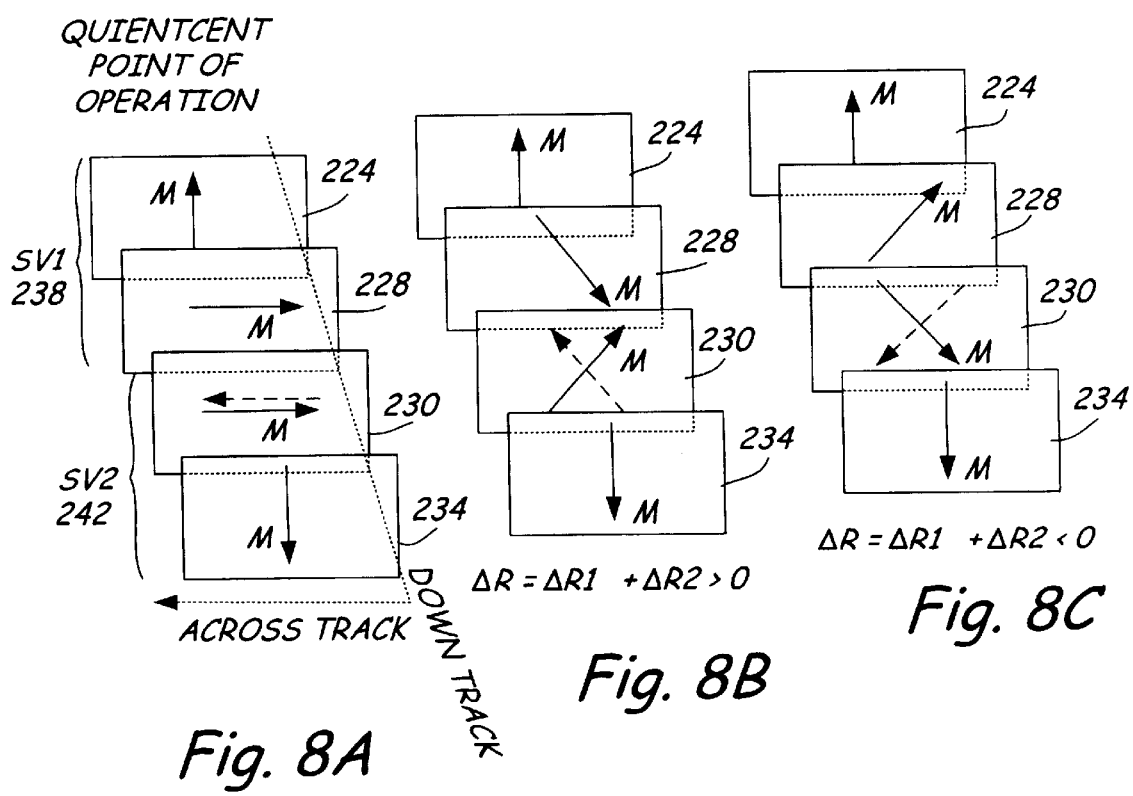

$\Delta V \propto (I_S/2)(\Delta R1 + \Delta R2)$
IDEALLY: $R_g \gg R_{SV}$ $\Delta V \propto I_S (\Delta R1 + \Delta R2)$
IDEALLY: $R_g \ll R_{SV}$

VERY HIGH LINEAR RESOLUTION CPP DIFFERENTIAL DUAL SPIN VALVE MAGNETORESISTIVE HEAD

CROSS-REFERENCE TO RELATED APPLICATION(S)

This application claims the benefit of the filing date of U.S. Provisional Application Serial No. 60/174,626 entitled "VERY HIGH LINEAR RESOLUTION CPP DIFFERENTIAL DUAL SPIN VALVE MAGNETORESISTIVE HEAD", which was filed Jan. 5, 2000.

BACKGROUND OF THE INVENTION

The present invention relates generally to giant magnetoresistive (GMR) transducers for retrieval of data in magnetic recording disc drives. In particular, the present invention relates to a spin valve type head for perpendicular recording.

A magnetoresistive read head retrieves magnetically-encoded information that is stored on a magnetic medium rigid disc. The magnetoresistive read head is typically formed of several layers that include a top shield, a bottom shield, and a read-element positioned between the top and bottom shields.

The read-element is generally a magnetoresistive thin film that exhibits spin-dependent scattering giant magnetoresistance effect. The resistance of a read-element changes in response to a magnetic field emanating from a magnetic medium when the GMR read head, flowing on a slider on a air bearing is positioned near a magnetic transition of the magnetic medium.

The magnetic fields that are produced by the magnetic patterns of the magnetic medium, corresponding to streams of "1" and "0", are sensed by the magnetoresistive element. By applying electrical current to the GMR read-element, the change in resistance in the read-element produces a voltage signal to first order linearly proportional to the local medium magnetic flux.

A commonly used GMR transducer is the spin valve head in which the read-element consists of a multi-layered structure formed of a ferromagnetic soft layer (free layer), a ferromagnetic hard layer (reference layer) and a nonmagnetic spacer layer positioned between the free layer and the reference layer.

The magnetization direction of the hard layer is typically set normal to the air bearing surface between the read head slider and the disc surface. The resistance of the sensor can be varied from a maximum value to a minimum value, by changing the orientation of the magnetization of the free layer from antiparallel to parallel to the reference layer, respectively.

One way to prepare a hard magnetic layer that exhibits GMR effect consists in preparing a soft layer exchange coupled to an antiferromagnetic layer. An antiferromagnetic layer that is in atomic contact with a soft ferromagnetic film can induce a unidirectional anisotropy field in the soft layer, which strength depends on the interface coupling energy between the couple.

The pinning field amplitude generally depends on the interfacial atomic and magnetic properties of the soft layer and the antiferromagnetic layer and on the temperature. The hard layer unidirectional anisotropy, exchange induced by an antiferromagnet can be set during film growth or by thermal treatment in an applied field.

The increase in storage capacity and data rate in disc drives has been accomplished by decreasing the bit length and the bit aspect ratio. These typically implicate that the track-width and the gap length of the read head are decreased and that the thickness of the magnetoresistive element and of the magnetic medium layer are decreased.

The decrease in the bit volume has been predicted and observed to cause erasing of the magnetic patterns. This time and temperature dependent loss of the recording bits information may limit longitudinal recording to areal densities below 300 Gbit/in$^2$. On the other hand, perpendicular recording media could exhibit thermally stable areal bit densities beyond 100 Gbit/in$^2$.

As in concurrent longitudinal recording, in perpendicular recording the data is recorded with a thin film inductive head and read-back with a magnetoresistive head. As the bits are packed in smaller areas to provide larger storage capacity and higher data rates, magnetoresistive heads providing higher signal amplitude and higher linear resolution are required.

Moreover, perpendicular recording media generate asymmetric fields that are converted into voltage signals by magnetic flux detecting magnetoresistive heads. Asymmetric read-back signals may require considerably different signal processing than that being applied in longitudinal recording.

Both spin valves and AMR type sensors have been tried with perpendicular recording media. These sensors produce an output signal referred to as a bipolar pulse. A electrical circuit that uses a high pass filter and consequently transforms bipolar pulses into unipolar pulses, has been applied to process with current channels the output signals of those read heads.

For several decades, disc drives use longitudinal recording and the signal processing that converts analog signals into digital bits is adequate for unipolar pulses. The use of differentiators results in the amplification of noise at high frequencies. At high linear densities (smaller bits) and high data rates, electronic noise makes the use of differentiators impractical.

BRIEF SUMMARY OF THE INVENTION

In this invention, a GMR read head provides enhanced sensitivity by using a read-element of two spin valves, operating in a current perpendicular to the plane geometry (CPP). The head is provided with high linear resolution and differential operation by incorporating an interlayer between the free layers of the two spin valves.

The differential mode of operation does not require shields for the head linear resolution and is accomplished by incorporating a thin gap layer between the free layers of the spin valves. The thickness of this interlayer can easily be made of the order of the bit length and defines the head intrinsic linear resolution.

The thin metallic gap also electrically connects the two spin valves in serial. Hence, the total signal amplitude is proportional to the sum of the variation of resistance of two spin valves. Moreover, the CPP spin-dependent scattering variation of resistance with applied field can be a factor of three higher than that commonly obtained with the current in the plane geometry.

The current perpendicular to the plane geometry is beneficial for the head sensitivity and track-resolution. The former is a consequence of the fact that in the CPP geometry, the variation of resistance increases with the decrease of the track-width. The latter results from the fact that the top and bottom electrodes do not define the magnetic read width.

The incorporation of a reproduce gap, defined by a metallic interlayer between the two magnetic flux sensor free layers is beneficial for high data rate magnetic recording disc systems. It provides the head with a differential character and a linear resolution that may be ultimately limited by the thickness of the interlayer, of the order of the bit length.

Moreover, the CPP differential dual spin valve head of in this invention is suitable for the retrieval of digital information stored in perpendicular disc media because it produces unipolar pulses similar to those obtained for decades with longitudinal recording. This property could pose less challenges to the signal processing of perpendicular recording disc drives.

The CPP differential dual spin valve (DDSV) read head of this invention includes a read-element that consists of a first and second spin valve stacks configured to operate in a current perpendicular to plane (CPP) geometry and in high linear resolution differential mode by incorporating a thin interlayer between two spin valve free layers.

The first and the second spin valve stacks each include a free layer and a metallic spacer is positioned adjacent to the free layer of the first and the second spin valve stacks and spaces the first spin valve stack apart from the second spin valve stack. By this way, no shields are required for the head linear resolution.

A magnetic permeable material can be incorporated between the write pole and the read-element multilayer to protect the read head from the write fringing fields. Nonethless, this head is configured to operate in a differential mode, in which, shields are not incorporated to define the head linear resolution.

BRIEF DESCRIPTION OF THE DRAWINGS

FIGS. 8A–8C show an exploded perspective view of various layers of a head according to the present invention.

DETAILED DESCRIPTION

Figure 1:
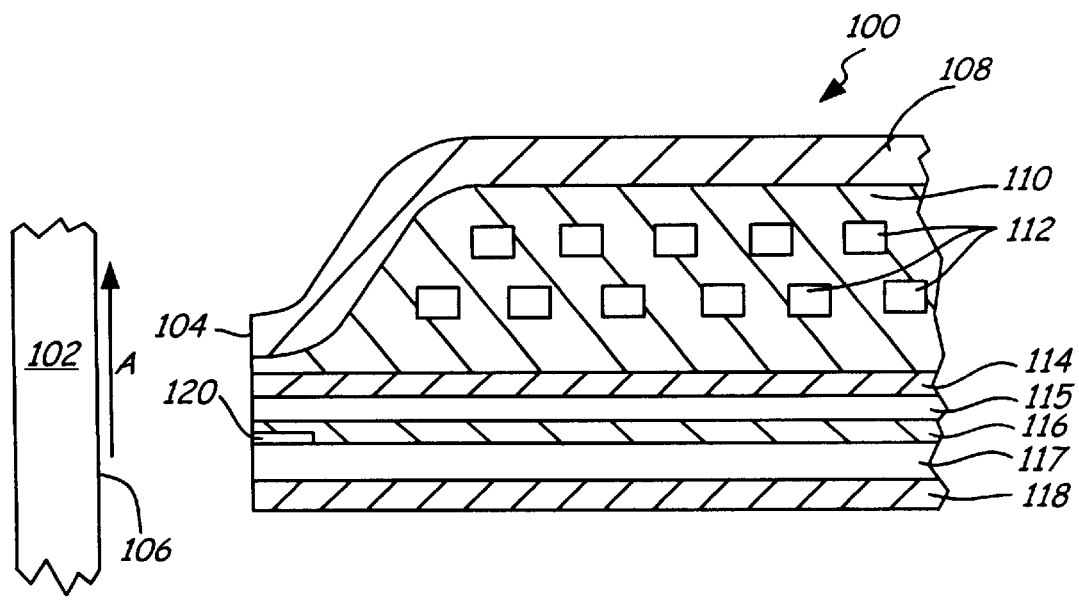
FIG. 1 is a cross-sectional view of a magnetic read/write head and magnetic disc taken along a plane normal to an air bearing surface of the read/write head.

FIG. 1 is a cross-sectional view of magnetic read/write head 100 and magnetic disc 102 taken along a plane normal to air bearing surface 104 of read/write head 100. Air bearing surface 104 of magnetic read/write head 100 faces disc surface 106 of magnetic disc 102. Magnetic disc 102 travels or rotates in a direction relative to magnetic read/write head 100 as indicated by arrow A. Spacing between air bearing surface 104 and disc surface 106 is preferably minimized while avoiding contact between magnetic read/write head 100 and magnetic disc 102.

A writer portion of magnetic. read/write head 100 includes top pole 108, insulator layer 110, conductive coils 112 and top shield 114. Conductive coils 112 are held in place between top pole 108 and top shield 114 by use of insulator 110. Conductive coils 112 are shown in FIG. 1 as two layers of coils but may also be formed of more layers of coils as is well known in the field of magnetic read/write head design.

A reader portion of magnetic read/write head 100 includes top shield 114, top gap layer 115, metal contact layer 116, bottom gap layer 117, bottom shield 118, and giant magnetoresistive (GMR) stack 120. Metal contact layer 116 is positioned between top gap layer 115 and bottom gap layer 117. GMR stack 120 is positioned between terminating ends of metal contact layer 116 and bottom gap layer 117. Top gap layer 115 is positioned between top shield 114 and metal contact layer 116. Bottom gap layer 117 is positioned between metal contact layer 116 and bottom shield 118. Top shield 114 functions both as a shield and as a shared pole for use in conjunction with top pole 108.

Figure 2:
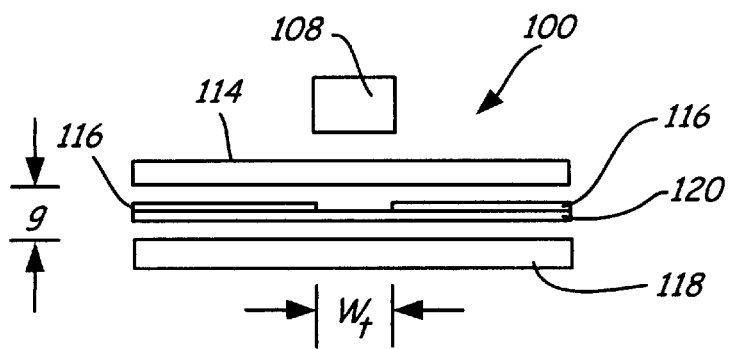
FIG. 2 is a layer diagram of an air bearing surface of a magnetic read/write head, in which read track-width is Wt and gap length is g.

FIG. 2 is a layer diagram of air bearing surface 104 of magnetic read/write head 100. FIG. 2 illustrates the location of magnetically significant elements in magnetic read/write head 100 as they appear along air bearing surface 104 of magnetic read/write head 100 of FIG. 1. In FIG. 2, all spacing and insulating layers of magnetic read/write head 100 are omitted for clarity. Bottom shield 118 and top shield 114 are spaced to provide for a location of GMR stack 120. GMR stack 120 has two passive regions defined as the portions of GMR stack 120 adjacent to metal contact layer 116. An active region of GMR stack 120 is defined as the portion of GMR stack 120 located between the two passive regions of GMR stack 120. The active region of GMR stack 120 defines a read sensor track-width.

Figure 3:
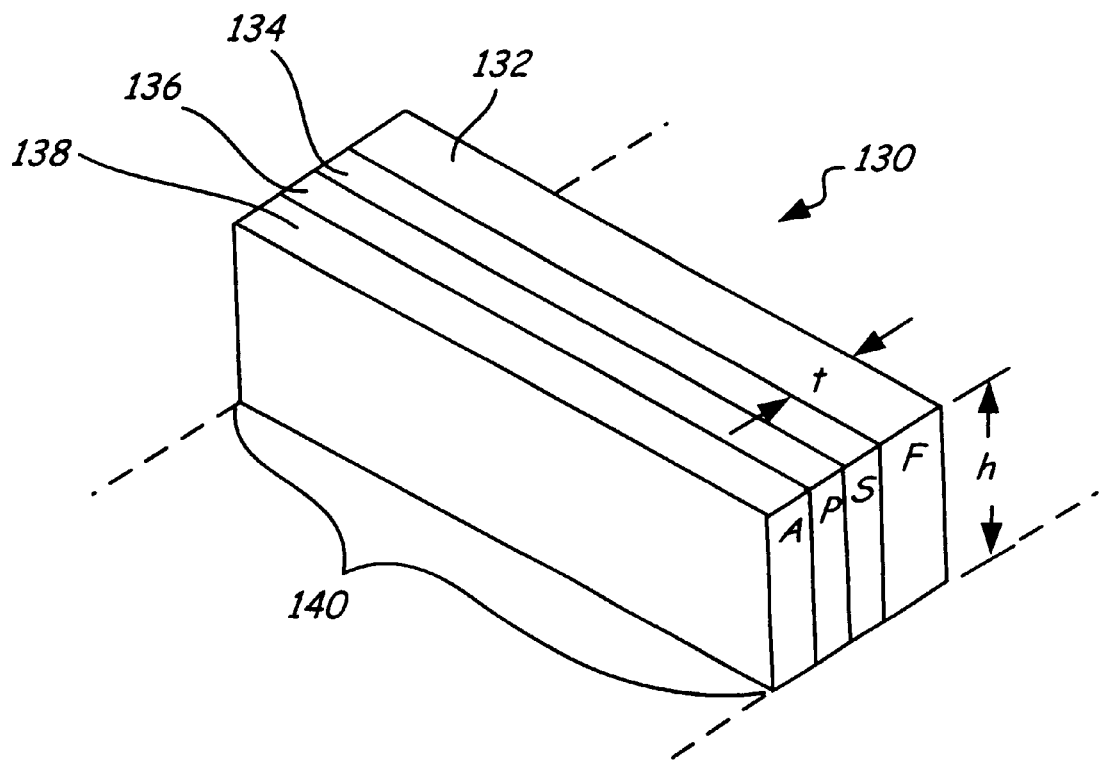
FIG. 3 is a perspective view of a prior art GMR stack, in which stripe height is indicated by h.

FIG. 3 is a perspective view of a prior art GMR stack 130. GMR stack 130 has free layer 132, spacer layer 134, reference layer 136, and antiferromagnetic layer 138. Spacer layer 134 is positioned between free layer 132 and reference layer 136. A magnetization of reference layer 136 is fixed in a predetermined direction, generally normal to air bearing surface 140 of GMR stack 130, while a magnetization of free layer 132 rotates freely in response to an external magnetic field (not shown in FIG. 3). Antiferromagnetic layer 138 is positioned on GMR stack 130 such that pinned layer 136 is between spacer layer 134 and antiferromagnetic layer 138. The magnetization of pinned layer 136 is pinned by exchange coupling pinned layer 136 with antiferromagnetic layer 138.

The resistance of GMR stack 130 varies as a function of an angle that is formed between the magnetization of pinned layer 136 and the magnetization of free layer 132. The magnetization of pinned layer 136 remains fixed in one direction, while the magnetization of free layer 132 rotates in response to a magnetic field emanating from a magnetic media or disc. The angle formed between the magnetization of free layer 132 and the magnetization of pinned layer 136 is, therefore, directly related to the magnetic field emanating from a magnetic media or disc. Consequently, the resistance of GMR stack 130 is linearly proportional to the magnetic field emanating from the magnetic media or disc.

Figure 4:
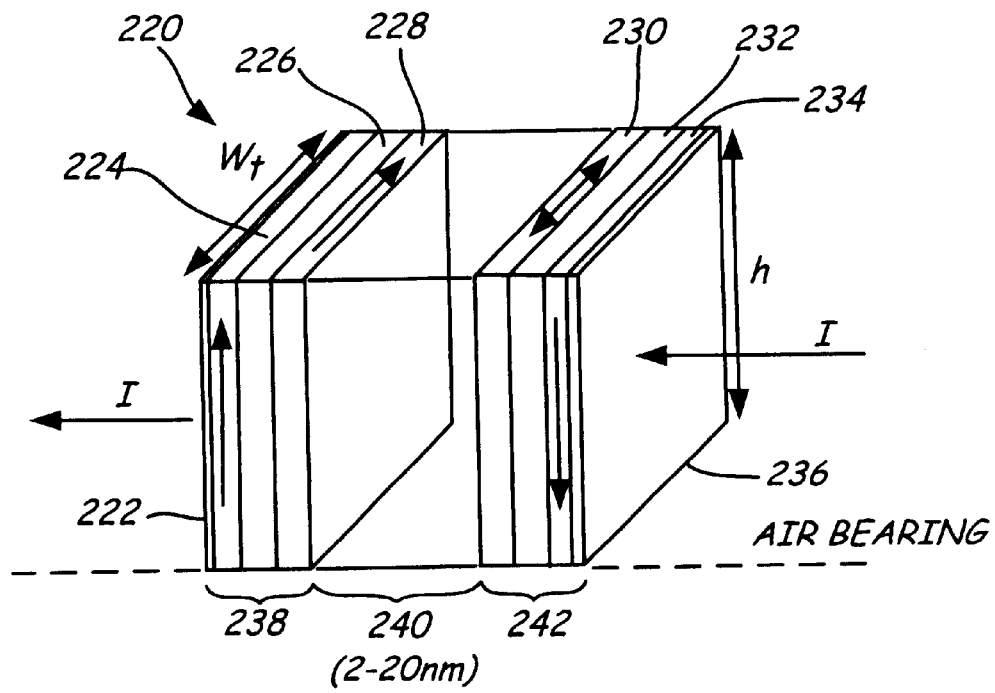
FIG. 4 shows a perspective view of a current-perpendicular-to-plane (CPP) differential dual spin valve head according to the present invention.

FIG. 4 shows a perspective view of a CPP differential dual spin valve head 220 according to the present invention. Head 220 uses a multi-layer planar structure consisting of two spin valves 238 and 242 electrically connected in serial. Spin valve 238 includes first exchange layer 222, first pinned layer 224, first spacer layer 226 and first free layer 228. Second spin valve 242 includes second free layer 230, second spacer layer 232, second pinned layer 234 and second exchange layer 236. Spin valves 238 and 242 have free layers 228 and 230, respectively, located in the center of the multilayer structure and spaced apart by metallic middle layer 240. The metallic interlayer physically defines the intrinsic linear resolution of head 220. Pinned layers 224 and 234 are located close to the top and bottom electrodes 250 and 252 (see FIG. 6) or are part of electrodes 250 and 252, and have magnetizations antiparallel to each other and oriented along the transverse direction or perpendicular to the air bearing surface. The preferred magnetization directions (M) of the various layers of head 220 are shown by arrows in FIG. 4. The direction of the current (I) is also shown in FIG. 4. "$W_t$" represents the track width of head 220, and "h" represents the stripe height of head 220.

First exchange layer 222 and second exchange layer 236 are exchange materials such as IrMn, NiMn or PtMn, with a thickness that optimizes the exchange field and blocking temperature. Pinned layers 224 and 234 are magnetically hard ferromagnetic layers, having a thickness in the range of about 2–10 nm. Pinned layers 224 and 234 are preferably made of Ni, Fe, Co, or any alloying composition of these, combined or not in a multilayer structure (e.g., $Ni_{80}Fe_{20}$/FeCo). The unidirectional anisotropy of pinned layers 224 and 234 is exchange induced by exchange layers 222 and 236, and set during film growth and/or by thermal treatment in an applied magnetic field. Exchange layers 222 and 236 provide pinned layers 224 and 234, respectively, with unidirectional anisotropy. Free layers 228 and 230 are soft ferromagnetic layers mostly consisting of perrnalloy with either FeCo or Co ultra-thin layers at one or both interfaces (e.g., $Ni_{80}Fe_{20}$/FeCo). Free layers 228 and 230 preferably have identical thicknesses, in the range of about 2–20 nm. Spacer layers 226 and 232 are made of a metal suitable for the GMR effect, such as Cu, Ag, Au, and have a thickness in the range of about 2–15 nm. Metallic middle layer 240 is a low resistivity metallic film such as W, Ti, Ta, or AlCu, and has a thickness in the range of about 2–20 nm. The thickness of metallic middle layer 240 defines the head gap length of head 220.

Figure 5:
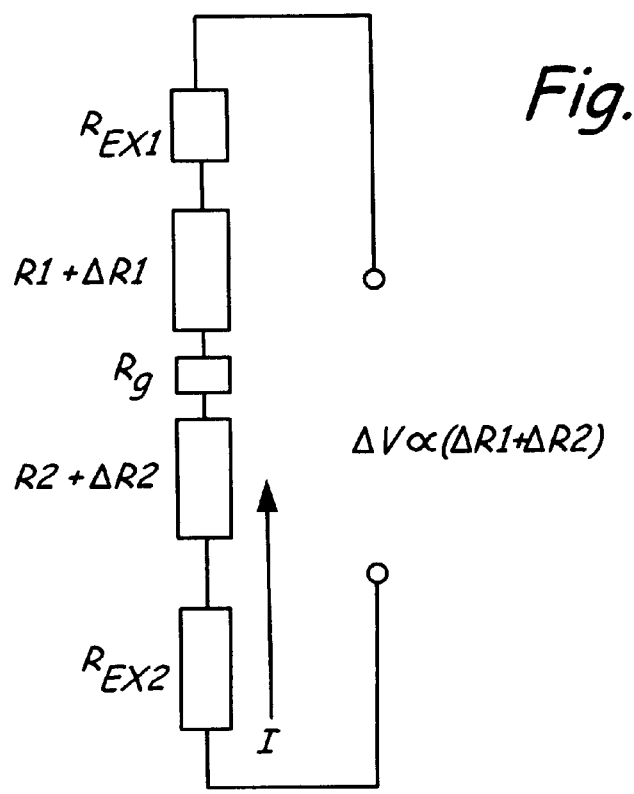
FIG. 5 shows an electrical circuit equivalent of the CPP differential dual spin valve head according to the present invention.

FIG. 5 shows an electrical circuit equivalent of head 220. $R_{EX1}$ represents the resistance of first exchange layer 222. R1 represents the resistance of first free layer 228. ΔR1 represents the change in resistance of first free layer 228 when it is exposed to magnetic flux. $R_g$ represents the resistance of metallic middle layer 240. R2 represents the resistance of second free layer 230. ΔR2 represents the change in resistance of second free layer 230 when it is exposed to magnetic flux. $R_{EX2}$ represents the resistance of second exchange layer 236. As shown in FIG. 5, the spin valves are electrically connected in serial. The change in output voltage of head 220 is proportional to the sum of ΔR1 and ΔR2, multiplied by the current (I).

Figure 6:
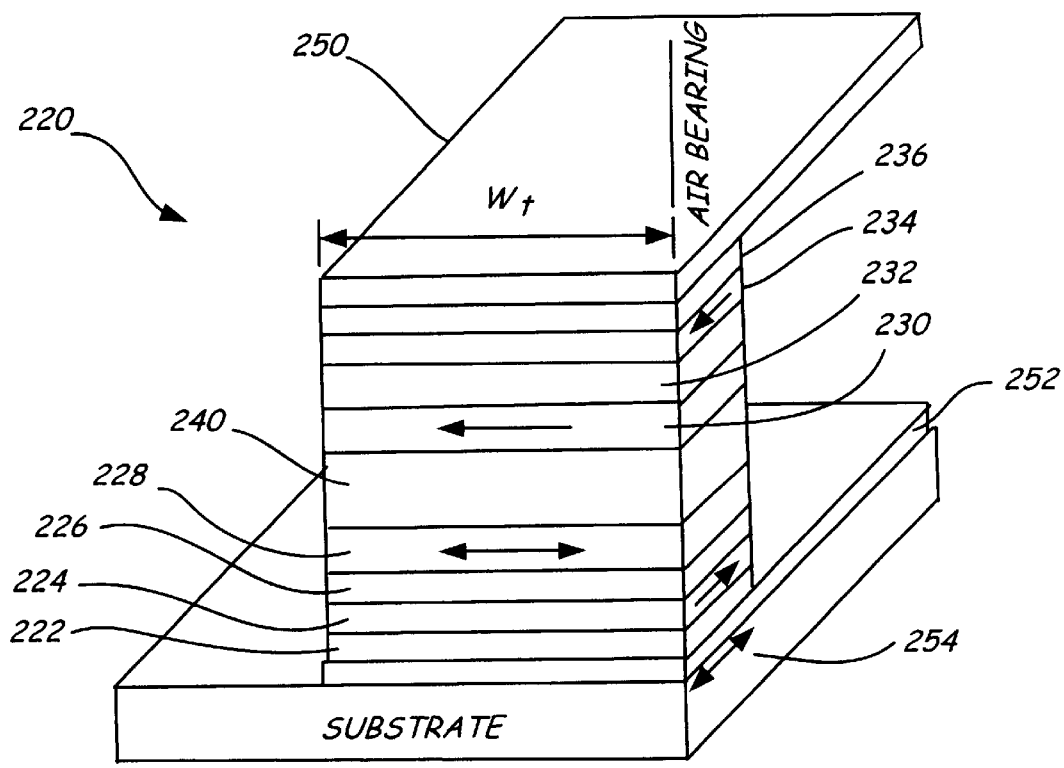
FIG. 6 shows a second perspective view of a CPP differential dual spin valve head according to the present invention, including additional layers.

FIG. 6 shows a second perspective view of head 220, including electrodes 250 and 252, and substrate 254, which were not shown in FIG. 4. The multi-layer structure in the CPP geometry shown in FIG. 6 is grown on substrate 254 by thin film techniques, in accordance with the following sequence: substrate 254/bottom electrode 252/seed layer (not shown)/first exchange layer 222/first pinned layer 224/first spacer layer 226/first free layer 228/metallic middle layer 240/second free layer 230/second spacer layer 232/second pinned layer 234/second exchange layer 236/top electrode 250/capping layer (not shown).

In a preferred embodiment, head 220 operates in differential mode and does not require shields to define the linear resolution. Head 220 has a intrinsic linear resolution defined by the thickness of metallic middle layer 240 between free layers 228 and 230. The reader gap length can be defined exactly by the spacing between the two free layers 228 and 230. Positioning free layers 228 and 230 closer together allows a higher linear resolution to be obtained.

Figure 7:
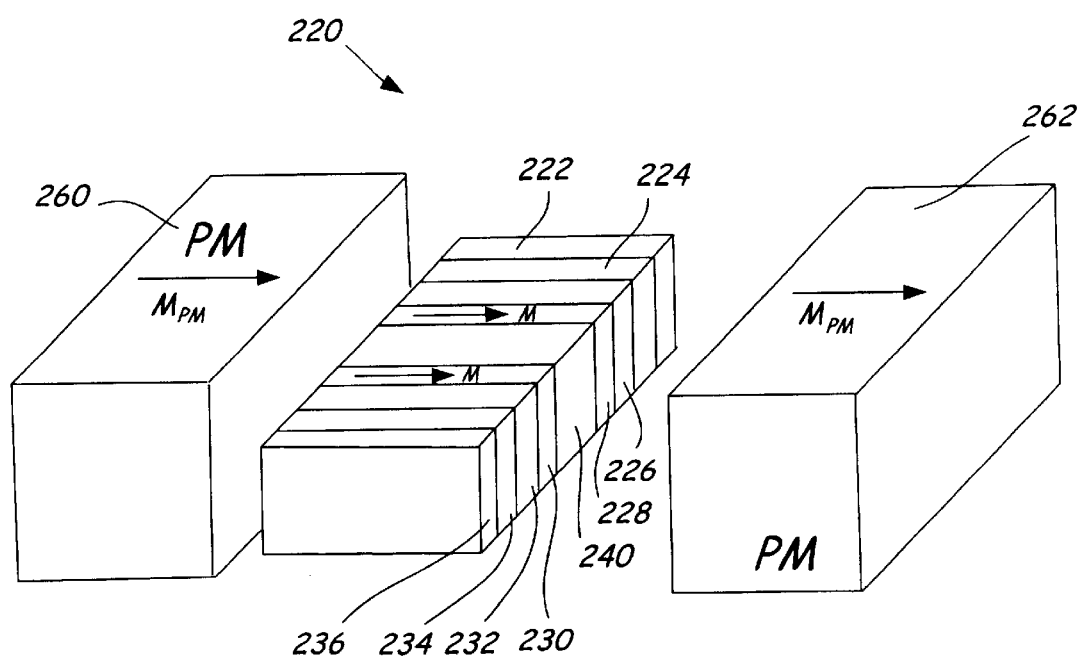
FIG. 7 shows a perspective view of a head according to the present invention with permanent magnet tabs.

The magnetization of free layers 228 and 230 can be oriented antiparallel through magnetostatic coupling and shape anisotropy, as shown in FIG. 6. Alternatively, the magnetizations can be oriented parallel using permanent magnet tabs 260 and 262 to apply to free layers 228 and 230, a low longitudinal field along the track-width direction as shown FIG. 7.

FIG. 8A shows the magnetizations of free layers 228 and 230, and pinned layers 224 and 234, at a quiescent point of operation. As shown by the two arrows on free layer 230, the magnetizations of free layers 228 and 230 may be stabilized either parallel or antiparallel. In a differential mode of operation, the signal output is maximum when the magnetizations of the free layers 228 and 230 rotate to an antiparallel magnetic configuration along the vertical direction (see FIG. 8A). The magnetizations of free layers 228 and 230 rotate in the presence of flux from a magnetic medium, as shown in FIGS. 8B and 8C. Differential operation is optimized by minimizing interlayer coupling and GMR effect between free layers 228 and 230, and by matching the GMR ratio of spin valves 238 and 242.

Head 220 potentially has several times higher signal amplitude than that of a similar structure in a current-in-plane (CIP) geometry for several reasons.

Figure 9A:
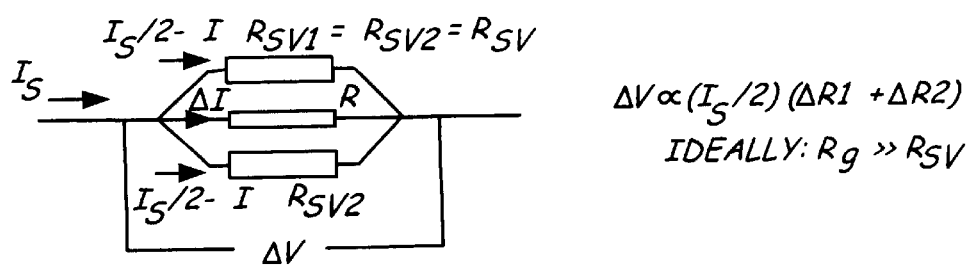
FIG. 9A shows an electrical circuit equivalent of a current-in-plane (CIP) differential dual spin valve head.
Figure 9B:
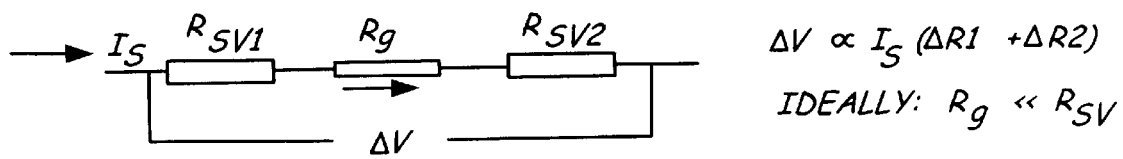
FIG. 9B shows an electrical circuit equivalent of a CPP differential dual spin valve head according to the present invention.

First, as shown by the equivalent electrical circuits shown in FIGS. 9A and 9B, in the CIP geometry (FIG. 9A), the spin valves are electrically connected in parallel, while in the CPP geometry, the spin valves are connected in serial (FIG. 9B). The serial connection is advantageous in the sense that the same electrical current ($I_s$) flows in both spin valves 238 and 242 (represented in FIG. 9B by resistances $R_{sv1}$ and $R_{sv2}$, separated by the resistance, $R_g$, of metallic middle layer 240) even if they have different electrical resistances. Moreover, the voltage signal is proportional to the sum of the product of current with resistance change of each spin valve 238 and 242. In contrast, in the CIP geometry (FIG. 9A), the current, $I_s$, is divided between the two spin valves ($R_{sv1}$ and $R_{sv2}$) and the metallic middle layer ($R_g$). In the CIP geometry, the voltage signal is proportional to the sum of the product of about half of the current with resistance change of each spin valve 238 and 242. Ideally, in the CIP geometry, the resistance of metallic middle layer 240 ($R_g$) is much greater than the resistance of the spin valves 238 and 242 ($R_{sv}$), whereas in the CPP geometry, $R_g$ is of the order or less than $R_{sv}$.

Second, the CPP GMR ratio for spin-dependent scattering can be two to ten times higher than that in the CIP geometry.

Third, for the same layer thickness, active area and current density, the CPP geometry allows, in most practical cases, higher current to be applied to the head than the CIP geometry does.

Figure 10:
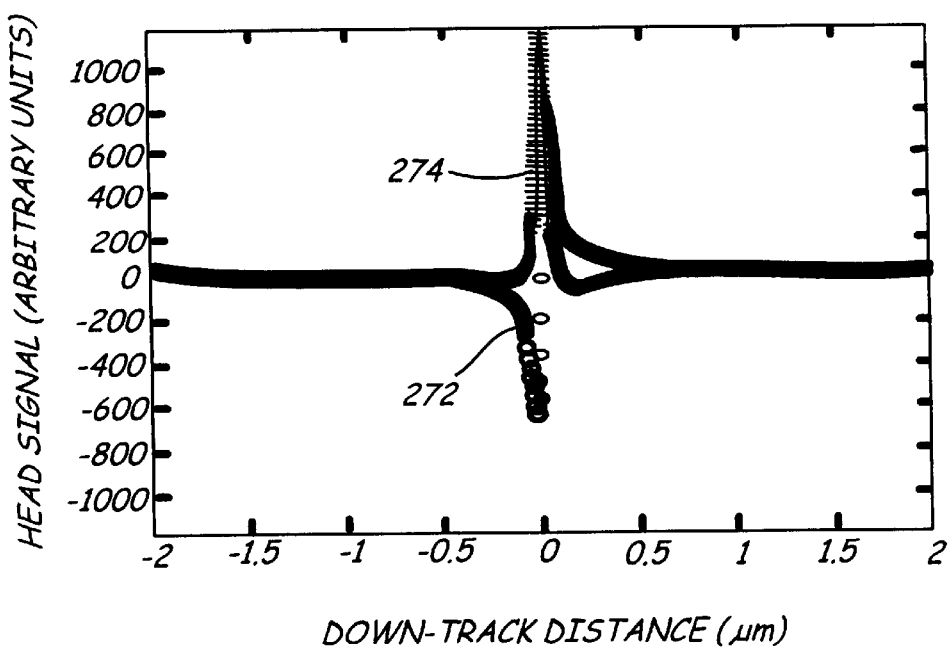
FIG. 10 shows output pulse shapes for a conventional shielded head and a head according to the present invention.

Head 220 can excel in signal amplitude and electronic signal-to-noise ratio with a perpendicular medium as it does not need differentiators to recover unipolar pulses. FIG. 10 shows the difference in pulse shape between a differential head 220 according to the present invention and a conventional spin valve head on a perpendicular recording medium. Line 272 represents the pulse shape of the spin valve head and line 274 represents a unipolar pulse generated by a differential head 220 according to the present invention. Line 272 is asymmetric and is like a bipolar pulse. The pulses shown in FIG. 10 are normalized (i.e., $dV/dV_{max}$). Conventional signal processing schemes that have been used for longitudinal recording may be used to process the unipolar pulse represented by line 274. Even though head 220 according to the present invention provides particular advantages when used with perpendicular recording media, head 220 may also be used with longitudinal recording media.

Although the present invention has been described with reference to preferred embodiments, workers skilled in the art will recognize that changes may be made in form and detail without departing from the spirit and scope of the invention.

What is claimed is:

1. A read head comprising:

first and second spit valves operating in a current perpendicular to plane(CPP) mode, the first and second spin valves each comprising a free layer; and means, positioned adjacent the free layers of the first and second spin valves, for connecting the first and second spin valves in serials such that at single CPP sense current flows serially through the first spin valve, the means for connecting the first and second spin valves in serial, and the second spin valve, and for defining a read head gap.

2. The read head of claim 1 wherein the means for connecting comprises a low resistivity interlayer between the first and second spin valves.

3. The read head of claim 1 wherein the interlayer has a thickness of about 2 nm to about 20 nm.

4. The read head of claim 1, wherein the first and second spin valves each further comprise a hard magnetic layer and a spacer layer.

5. The read head of claim 4, and further comprising:

a first electrode coupled to the first spin valve; and a second electrode coupled to the second spin valve.

6. The read head of claim 1 wherein magnetizations of the free layers are antiparallel to each other and are parallel to an air bearing surface of the read head.

7. The read head of claim 1, and further comprising:

a first and second permanent magnet, the first and second permanent magnet each positioned adjacent to the first and second spin valves, the first and the second permanent magnets biasing the magnetizations of the free layers in a parallel configuration.

8. The read head of claim 4, wherein magnetizations of a pinned layer of the first spin valve and a pinned layer of the second spin valve are antiparallel to each other and perpendicular to an air bearing surface of the head.

9. A read head comprising;

first and second spin valves connected in serial and operating in a current perpendicular to plane (CPP) mode, the first and second spin valves comprising a free layer; and means, positioned adjacent the free layers of the first and second spin valves, for defining a read head gap between the first and second spin valves and for allowing a single CPP sense current to flow serially through the first spin valve, the means for defining a read head gap, and the second spin valve.

10. The read head of claim 9, and further comprising:

a first electrode connected to the first spin valve; and a second electrode connected to the second spin valve.

11. A dual spin valve read head comprising:

a first and second spin valve stacks configured to operate in a current perpendicular to plane (CPP) mode the first and the second spin valve stacks each including a free layer; and spacer means adjacent the free layers of the first aid the second spin valve stacks for spacing the first spin valve stack apart from the second spin valve stack and for allowing a single CPP sense current to flow serially through the first spin valve stack, the spacer means, and the second spin valve stack.

12. The dual spin valve read head of claim 11, wherein the thickness of the spacer means is between about 2 and 20 nm.

13. The dual spin valve read head of claim 11, wherein the head has differential character, in which, the linear resolution of the head is not defined by shields but by an interlayer spacer between the free layers of two spin valves.

14. The dual spin valve read head of claim 11, wherein the head has differential character, which produces unipolar pulses in response to magnetic transitions of perpendicular recording.

\* \* \* \* \*

UNITED STATES PATENT AND TRADEMARK OFFICE
CERTIFICATE OF CORRECTION

PATENT NO.     : 6,643,103 B1                                               Page 1 of 1
DATED          : November 4, 2003
INVENTOR(S)    : Isabel G. Trindade It is certified that error appears in the above-identified patent and that said Letters Patent is hereby corrected as shown below:

Column 7,
Line 24, delete "spit" and insert -- spin --
Line 29, delete "serials such that at" and insert -- serial such that a --

Column 8,
Line 11, delete "comprising;" and insert -- comprising: --
Line 31, delete "aid" and insert -- and --

Signed and Sealed this

Tenth Day of February, 2004

JON W. DUDAS
*Acting Director of the United States Patent and Trademark Office*